United States Patent Office 3,824,287
Patented July 16, 1974

3,824,287
PRODUCTION OF N,N,N',N'-TETRAACETYL-
ETHYLENEDIAMINE
Guenther Matthias, Ludwigshafen, Christoph Palm, Mannheim, and Gerhard Schulz, Ludwigshafen, Germany, assignors to Badische Anilin- & Soda-Fabrik Aktiengesellschaft, Ludwigshafen (Rhine), Germany
No Drawing. Filed Oct. 20, 1971, Ser. No. 190,818
Claims priority, application Germany, Oct. 28, 1970, P 20 52 822.7
Int. Cl. C07c 103/30
U.S. Cl. 260—561 R         5 Claims

ABSTRACT OF THE DISCLOSURE

Production of N,N,N',N'-tetraacetylethylenediamine by reaction of diacetylethylenediamine with acetic anhydride and ketene. The products are starting materials for the production of textile auxiliaries, cleaning agents and pesticides.

---

The invention relates to a process for the production of N,N,N',N'-tetraacetylethylenediamine by reaction of diacetylethylenediamine with acetic anhydride and ketene.

It is known that tetraacetylethylenediamine can be obtained by reaction of diacetylethylenediamine with ten times its weight of acetic anhydride (Recueil des Travaux Chimiques des Pays-Bas, 30, (1911), 183–185). The process gives unsatisfactory yields of end product. The solubility of tetraacetylethylenediamine in such reaction mixtures is particularly high and this results in lower yields and makes it necessary to process the mother liquor by distillation.

According to German Laid-Open Specification No. 1,910,300 tetraacetylethylenediamine is obtained when ethylenediamine or diacetylethylenediamine is reacted with ketene at from 40° to 100° C. in the presence of orthophosphoric acid as catalyst and in the presence or absence of an organic inert solvent, for example acetone, chloroform or ethyl acetate. This method has the following disadvantages: The solubility of the reaction components is very low at the said temperatures. Consequently large amounts of solvents have to be used and fairly dilute solutions have to be used, for example 15% by weight of solid in Example 2, and 4.4% by weight of solids in Example 4. The method thus requires fairly large reactors and therefore high capital costs, large amounts of energy for heating up and evaporation of the solvent and consequently high energy costs. Furthermore the space-time yields are low; in Example 6 they reach only from 15.2 to 19.2 kilograms per cubic meter per hour in a continuous experiment. The conversion of ketene and therefore the yield of end product (with reference to the ketene used) is unsatisfactory. Only some of the ketene is absorbed, the remainder leaves the reaction chamber and entrains a large amount of solvent (contamination of the effluent ketene, loss of solvent and possible costs for condensation). The solubility of the tetraacetylethylenediamine in the organic solvents is also still considerable at low temperature so that in order to achieve good yields it is necessary to apply strong cooling (Example 1: −8° C.; Example 5: 2° C.) or the solvent may even have to be removed by evaporation (Example 3). These measures involve additional costs and are necessary in order to avoid further substantial losses in yield.

The object of this invention is a new process for producing N,N,N',N' - tetraacetylethylenediamine in better yields, space-time yields and purity in a simpler and more economical manner.

We have found that N,N,N',N'-tetraacetylethylenediamine having the formula:

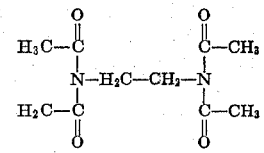
(I)

is advantageously obtained starting from diacetylethylenediamine and acetic anhydride by reacting diacetylethylenediamine with acetic anhydride and ketene.

The reaction may be represented by the following formulae:

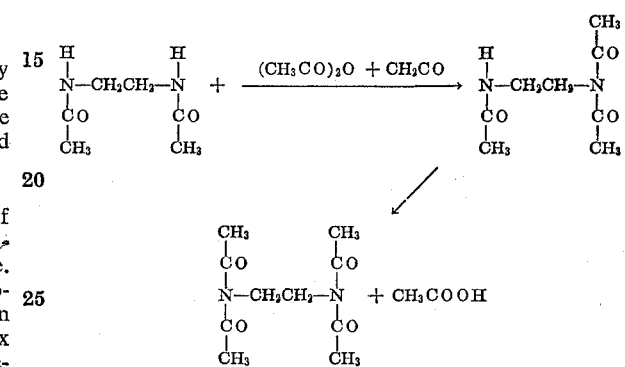

In comparison with the prior art methods, the process of the invention gives N,N,N',N'-tetraacetylethylenediamine in better yields, space-time yields and purity in a simpler and more economical way. Surprisingly no catalysts or solvents are needed and consequently no special purification or distillation of the reaction mixture. The acetic acid formed reacts with ketene again to form the starting material acetic anhydride. The starting acetic anhydride and ketene are reacted with the starting N,N-diacetylethylenediamine or preferably N,N'-diacetylethylenediamine in stoichiometric amounts or in excess, preferably in a ratio of from 2.5 to 50, particularly from 2 to 5, moles of acetic anhydride and one mole of 3 moles of ketene to 1 mole of diacetylethylenediamine. The production of the tetraacetyl compound takes place via N,N,N'-triacetylethylenediamine. When less than the stoichiometric amounts of ketene and acetic anhydride are used, mixtures are obtained having a content of from 1 to 25% by weight of the triacetyl compound. In the case of more than eight times an excess of acetic acid alone over the stoichiometric amount or an excess of 0.2 times of ketene in the case of the stoichiometric amount of acetic anhydride, pure tetraacetyl compound is obtained as the result of the reaction without any appreciable amounts of the triacetyl compound. Reaction with smaller amounts of the two starting materials gives mixtures of the said two end products with proportionately increasing contents of triacetyl compound the smaller the proportion of these starting materials is.

The ketene for the process may be in pure form or in the form of crude ketene such as is obtained after cleavage of acetic acid, after addition of ammonia and cooling, for example to 10° C. This crude ketene may contain impurities such as methane, carbon dioxide, carbon monoxide, ethylene, propene, butadiene, butyne, hydrogen and particularly vapors of water, acetic acid and acetic anhydride, for example in a composition of 80.5% by volume of ketene, 2.5% by volume of the vapors of acetic acid and acetic anhydride, 16.5% by volume of gaseous impurities (inert gas) and possibly 0.5% by weight of salts, for example ammonium phosphate. The ketene in crude or purified form is usually at a temperature of from −50° to +40° C., preferably from −10° to +10° C., and at a pressure of from 0.05 to 0.5, preferably from 0.05 to 0.2, atmospheres.

The reaction is generally carried out at a temperature of from 40° to 150° C., preferably from 90° to 150° C., particularly from 135° to 147° C., under superatmospheric pressure or preferably at atmospheric pressure, continuously or batchwise. Solvents are not essential to the process but organic solvents which are inert under the reaction conditions may be added if desired, such as aromatic hydrocarbons, for example toluene; and chlorinated hydrocarbons, for example trichloroethylene or chloroform.

The reaction may be carried out in the liquid phase or in the vapor phase. It is preferred to use distillation units, particularly packed columns or plate columns such as sieve plate columns, Oldershaw columns, glass tray columns, bubble tray columns and valve plate columns. It is advantageous to use plate column which permit a flow of substance of 0.01 to 0.6 parts by weight per hour of ketene entering the column per part by weight of liquid in the column. In a bubble tray column the ratio of weir height to diameter is from 0.2:1 to 0.4:1 is preferred, in a ball valve plate column and a sieve plate column a diameter of the orifices of from 5 to 15 mm., a ball diameter of from 8 to 30 mm. and plate distances of from 300 to 800 mm. are preferred.

The reaction may be carried out as follows: Diacetylethylenediamine is dissolved in acetic anhydride, the mixture is brought to the reaction temperature, advantageously from 140° to 145° C. at atmospheric pressure, and this temperature is maintained for from one hour to eight hours, preferably from ninety minutes to three hours. The ascending vapor is condensed in a reflux condenser and flows back into the reaction mixture through an empty tube, the trays of a plate column or through a stirred vessel. Ketene is advantageously introduced at a point in the vicinity of the liquid phase into the column or into the stirred vessel. In a preferred method of operation plate columns are used and the ketene is introduced into the condensate on a plurality of trays or particularly into the condensate on one tray in the middle of the column. Introduction of the ketene into the liquid reaction mixture of the still is possible but less expedient than introduction into the vapor space and particularly into the condensate of the column or distillation unit, in order to achieve an optimum yield of end product. The rate of introduction of ketene is adjusted advantageously in accordance with the color of the condensate, ketene feed being throttled when there is a yellow coloration. The temperature at the ketene inlet is advantageously from 40° to 140° C., preferably from 90° to 137° C. After reaction is over, the solution is advantageously cooled to 15° C. as quickly as possible to achieve small crystals so that the end product separates. The smaller the crystals, the more cleanly they are precipitated and therefore the more easily they may be washed. The end product is then isolated by a conventional method, for example the reaction mixture is filtered, the filtered material is advantageously washed with an equal weight or three times the amount of acetic anhydride or the same amount of distillate from the mother liquor and dried. Cold water at 0° to 5° C. may also be used for washing. The mother liquor remaining after the end product has been separated may serve as reaction medium for further batches in the process of the invention and this represents economical utilization of unreacted starting material. The compounds which can be prepared by the process of the invention are valuable starting materials for the production of textile auxiliaries, cleaning products and pesticides. They may be added as activators, for example in an amount of from 0.1 to 15% by weight, to detergents or bleaching agents which contain not only an anionic or cationic or nonionic surfactant but also a compound which gives off active oxygen. They are also suitable for the production of lubricants for viscose rayon. Reference is made to the abovementioned publications for details of applications.

The following Example illustrates the invention. The parts specified are parts by weight.

EXAMPLE

The apparatus used is a bubble tray column having ten trays each having one bubble cap and a reflux condenser. The ratio of weir height to the diameter of the column is 0.3:1. The starting mixture consists of 513 parts of N,N-diacetylethylenediamine and 1224 parts of acetic anhydride. The mixture is boiled so that the bubble trays fill and a constant reflux takes place. Introduction of ketene is commenced after fifteen minutes. 180 parts of ketene is introduced during three hours at a rate of from 50 to 80 parts by weight per hour at the fourth tray from the bottom into the condensate. Ketene conversion amounts to 94.1% of theory. The temperature in the condensate of the trays is 140° to 145° C. After three hours, the whole is cooled to 16° C. so that tetraacetylethylenediamine crystallizes out. The crystals are suction filtered and washed with 1000 parts of acetic anhydride. The crystals are similarly separated which are obtained by evaporation of the mother liquor to 300 parts by volume. The end substance is dried at 80° C. and 16 mm. for ten hours. 775 parts of end product is obtained having a melting point of 153° to 155° C. A 3% by weight solution in chloroform shows a color number of 12 hazes. The yield is 95.5% of theory and the space-time yield is 211 kg./m.³/h.

We claim:

1. A process for the production of N,N,N',N'-tetraacetylethylenediamine having the formula:

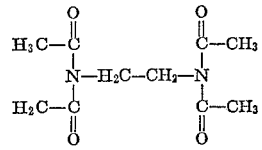

starting from diacetylethylenediamine and acetic anhydride wherein diacetylethylenediamine is reacted at 90–150° C. under reflux conditions with acetic anhydride and ketene at a ratio of 2.5 to 50 moles of acetic anhydride and 1 to 3 moles of ketene per mole of diacetylethylenediamine.

2. A process as claimed in claim 1 carried out at a temperature of from 135° to 147° C.

3. A process as claimed in claim 1 carried out in an organic solvent which is inert under the reaction conditions.

4. A process as claimed in claim 1 wherein the reaction is conducted at a temperature of 90° to 150° C. in a distillation column under reflux conditions.

5. A process as claimed in claim 1, the reaction being carried out in the absence of a catalyst for the reaction.

References Cited

UNITED STATES PATENTS 3,557,207   1/1971   Hammond _____ 260—561 R

FOREIGN PATENTS 907,357   10/1962   Great Britain _____ 260—561 R
1,046,487   10/1966   Great Britain ____ 260—561 R LEWIS GOTTS, Primary Examiner E. G. LOVE, Assistant Examiner